(12) United States Patent
Wang et al.

(10) Patent No.: US 8,907,954 B2
(45) Date of Patent: Dec. 9, 2014

(54) METHOD FOR VISUALIZING A COMPLICATED METRO MAP IN A LIMITED DISPLAYING AREA

(75) Inventors: Yu-Shuen Wang, Tainan (TW); Ming-Te Chi, New Taipei (TW)

(73) Assignee: National Chiao Tung University, Hsinchu (TW)

( * ) Notice: Subject to any disclaimer, the term of this patent is extended or adjusted under 35 U.S.C. 154(b) by 251 days.

(21) Appl. No.: 13/422,108

(22) Filed: Mar. 16, 2012

(65) Prior Publication Data
US 2013/0155115 A1  Jun. 20, 2013

(30) Foreign Application Priority Data

Dec. 16, 2011  (TW) .............................. 100146797 A

(51) Int. Cl.
G06T 11/20 (2006.01)
G01C 22/00 (2006.01)
G06F 3/048 (2013.01)

(52) U.S. Cl.
USPC .............................. 345/440; 701/26; 715/788

(58) Field of Classification Search
CPC . G08G 1/0104; G08G 1/0137; G08G 1/0108; G08G 1/0968; G08G 1/096805; G08G 1/096833; G08G 1/096855; G08G 1/096877; G08G 1/0969; G08G 1/096811; G01C 21/00; G01C 21/34; G01C 21/3446; G01C 21/3667; G01C 21/3676

See application file for complete search history.

(56) References Cited

U.S. PATENT DOCUMENTS

| 6,591,187 | B2 | 7/2003 | Hotta |
| 6,859,723 | B2 * | 2/2005 | Yokota .......................... 701/532 |
| 7,493,212 | B2 | 2/2009 | Sumizawa et al. |
| 2003/0182052 | A1 * | 9/2003 | DeLorme et al. ............. 701/201 |
| 2007/0219708 | A1 * | 9/2007 | Brasche et al. ............... 701/207 |
| 2009/0182501 | A1 * | 7/2009 | Fyke et al. ..................... 701/208 |
| 2010/0088631 | A1 * | 4/2010 | Schiller ........................ 715/784 |
| 2010/0123737 | A1 * | 5/2010 | Williamson et al. .......... 345/672 |
| 2012/0117522 | A1 * | 5/2012 | Feng et al. ....................... 716/54 |
| 2014/0025298 | A1 * | 1/2014 | Spindler et al. ............... 701/533 |

FOREIGN PATENT DOCUMENTS

| JP | 10-198267 A | 7/1998 |
| TW | 370140U1 M | 5/1998 |

OTHER PUBLICATIONS

Stott, Jonathan, et al. "Automatic metro map layout using multicriteria optimization." Visualization and Computer Graphics, IEEE Transactions on 17.1 (2011): 101-114.*

(Continued)

*Primary Examiner* — Carlos Perromat
*Assistant Examiner* — Nurun N Flora
(74) *Attorney, Agent, or Firm* — Rosenberg, Klein & Lee

(57) ABSTRACT

The prevented invention provides a method to visualize complicated metro maps in a limited displaying area, in which the route to the passenger's destination is highlighted. In order to achieve high readability, it sets 1) the distance between neighboring stations to be equal, 2) the transportation lines to lie in octilinear directions, 3) the angles of incident edges at each station to be maximized, and 4) the station positions to be inside the displaying area. It also labels the names of stations that passenger will pass by to make the route navigation easy and intuitive.

13 Claims, 6 Drawing Sheets

(56) References Cited

OTHER PUBLICATIONS

Nollenburg, Martin, and Alexander Wolff. "Drawing and labeling high-quality metro maps by mixed-integer programming." Visualization and Computer Graphics, IEEE Transactions on 17.5 (2011): 626-641.*

Martin Nollenburg and Alexander Wolff; Drawing and Labeling High-Quality Metro Maps by Mixed-Integer Programming; IEEE Transactions on Visualization and Computer Graphics.

Jonathan Tott, Peter Rodgers, Juan Carlos Martinez-Ovando, Stephen G. Walker; Automatic Metro Map Layout Using Multicriteria Optimization; Journal of Latex Class Files, vol. 6, No. 1, Jan. 2007.

Yu-Shuen Wang and Ming-Te Chi, Focus+Context Metro Maps, IEEE Computer Society Visualization and Graphics Technical Committee, Oct. 27, 2011.

* cited by examiner

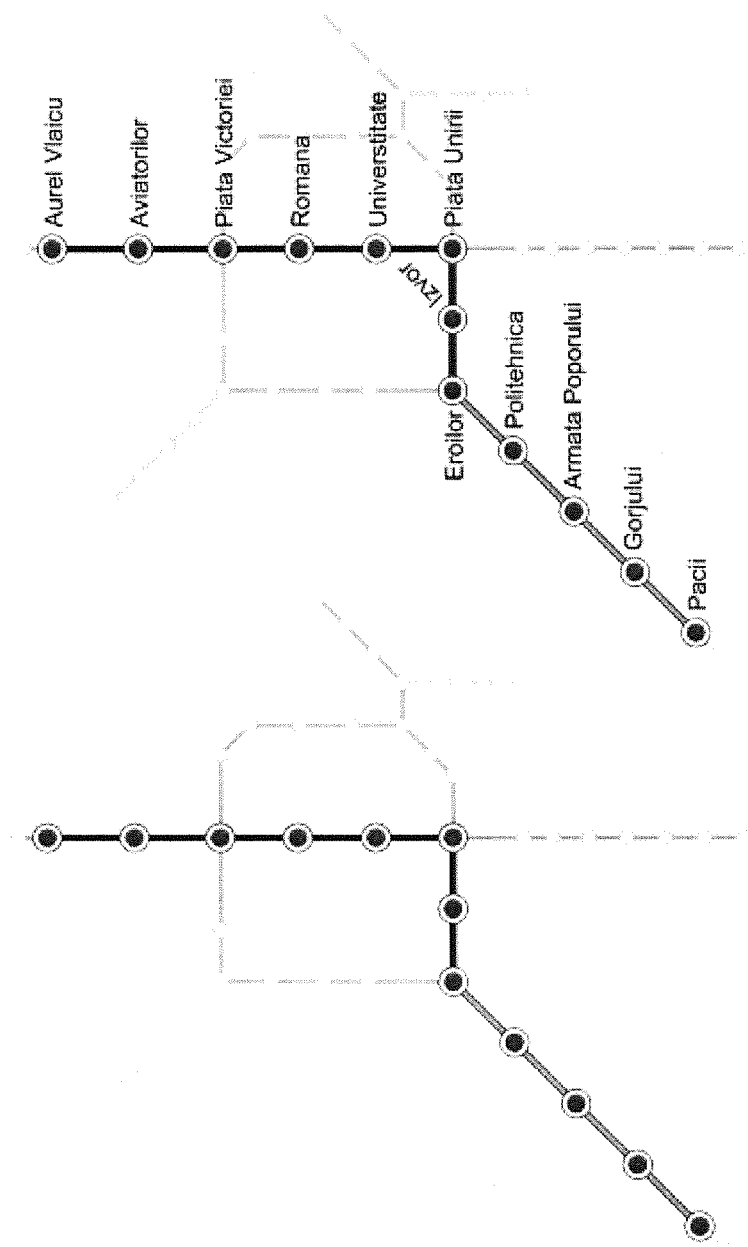

METHOD FOR VISUALIZING A COMPLICATED METRO MAP IN A LIMITED DISPLAYING AREA

BACKGROUND OF THE INVENTION

1. Field of the Invention

The presented invention relates to a data visualization technique, particularly, a method for visualizing a complicated metro map in a limited displaying area.

2. Description of the Related Art

The conventional technologies for visualizing traffic information in a limited displaying area (ex: mobile device) are normally based on text and tables, which are unable to present the space relationships of transportation networks. According to the theory of visual cognition, the comprehension of graphs is much more efficient than text to most people. Therefore, converting tangled numbers and text data into graphs usually provides more information to users.

There have been graph-based methods for visualizing complicated metro maps on a mobile device. However, the prior arts cannot dynamically show the transportation routes on demand but can only present static information because of the limited computational capability. In order to keep the integrity of a metro map, they present all the stations and the connected edges on the screen. However, a ticket or a mobile phone tends to be exquisite and has a small displaying area, which is hard to visualize the complicated information. The prior arts can only present partial metro maps at a time. Otherwise the station names and the graph topologies will be too small to be recognized.

Accordingly, the presented invention introduces a method to visualize a complicated metro map in a limited displaying area in order to overcome the abovementioned problems. The practical design and the detailed embodiments of the presented invention are described below.

SUMMARY OF THE INVENTION

The primary objective of the presented invention is to visualize a complicated metro map in a limited displaying area, which deforms the original metro map non-proportionally, wherein 1) the distance of neighboring stations is constrained to have an equal length, 2) each transportation route extends in an octilinear (vertical, horizontal, 45-degree or 135-degree diagonal) direction, 3) the intersected edges have equal included angles, 4) the transportation routes are dispersed and exempted from overlapping, and 5) the metro map is optimized to be clear and artistic.

Another objective of the presented invention is to visualize a complicated metro map in a limited displaying area, which prevents the relative geographic positions of the stations from changing too much during the metro map deformation.

Still another objective of the presented invention is to visualize a complicated metro map in a limited displaying area, which magnifies and highlights the route that the user will pass by lest the user confuses the focal route with other routes.

A further objective of the presented invention is to visualize a complicated metro map in a limited displaying area, which labels the station names at the optimal positions lest the labeled names overlap with each other, occlude the routes or be cropped by the screen boundaries, so that the user can read the metro map easily.

To achieve the abovementioned objectives, the presented invention introduces a method for visualizing a complicated metro map in a limited displaying area. The metro map contains a plurality of routes. Each route contains a plurality of stations. Each pair of adjacent stations is connected by an edge. The method of the presented invention comprises steps: 1) download a geographic metro map according to the start station node and the destination station node given by the user, wherein the geographic metro map contains the start and the destination station nodes and the surrounding transportation routes; 2) deform the map to have a schematic layout; 3) highlight the stations and the edges along the best route from the start station to the destination station, and 4) label names beside the stations.

Below, the detailed embodiments are described to make the objectives, technical content, characteristics and accomplishments of the presented invention easily understood.

BRIEF DESCRIPTION OF THE DRAWINGS

FIGS. 2a-2d schematically show the results of the respective steps of a method for visualizing a complicated metro map in a limited displaying area according to one embodiment of the presented invention;

DETAILED DESCRIPTION OF THE INVENTION

The presented invention introduces a method for visualizing a complicated metro map in a limited displaying area, which uses a local zooming technique to clearly display the route that the user will pass by. The user can easily understand the transportation network, especially the stations along the focal routes, without laboriously dragging the metro map. It is no doubt that instantaneity of computing a metro map is very important to passengers that are waiting for a train. The presented real-time technique can retrieve the required metro map and deform the map to fit the screen resolution in a very short time.

Figure 1:
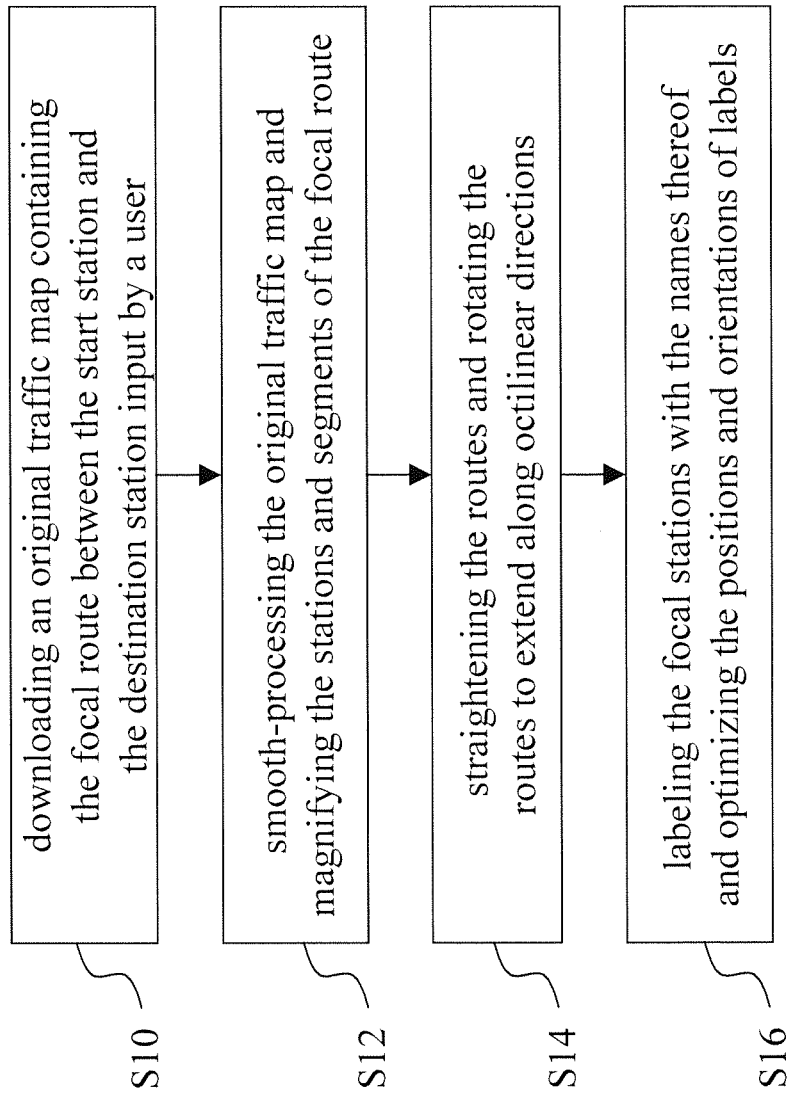
FIG. 1 shows the flowchart of the method for visualizing a complicated metro map in a limited displaying area according to the presented invention.

FIG. 1 shows the flowchart of the presented technique, which can visualize a complicated metro map in a limited displaying area. When the user inputs the start and the destination stations, our system downloads the metro map and magnifies the stations and the connected edges along the route from the start station to the destination station. The remaining routes are then shrunk to save the space. In addition, it schematizes the metro map layout to make the information visualization easily. The method of the presented invention includes the following steps.

Step S10: download the geographic metro map containing the start and the destination station nodes from a database or network.

Step S12: deform the original metro map to fully utilize the limited displaying area, wherein the edges and the stations that the user will pass by are magnified, and the others are minified.

We take the map with geographic station positions as a reference and apply the deformation technique to relocate each station. Formally, we denote the map by a graph G={V, E}, where V={$v_0$, $v_1$, ..., $v_n$}, n is the number of stations, $v_i=(v_{i,x}, v_{i,y}) \in R^2$ is the node denoting the geographic station position and E is the set of connecting edges. We call the edges on the route of a passenger focal edges and the others contextual edges. To achieve focus+context visualization, the focal edges are magnified while the contextual edges are shortened to retain the whole map persisting in the bounding space. In addition to highlighting the focal edges, we also constrain the deformed layout to satisfy the characteristics of a metro map. Specifically, we formulate the constraints such as regular edge lengths and equal angles of incident edges into energy terms. Our goal is to find the unknown station positions that can minimize the objective function while the edges are untouched. Since the introduced constraints such as the edge magnification and the boundary condition may conflict with each other, we solve for the unknown node positions in a least squares sense.

To achieve high regularity, we enforce the lengths of focal and contextual edges to be $D_\alpha$ and $D_\beta$ ($D_\alpha > D_\beta$), respectively. By doing this step, the geographic distance between each pair of neighboring stations would apparently disappear. However, we believe the actual distance does not mean too much to passengers because travel time of neighboring stations is usually short in an urban city. To implement this idea, we minimize $$\Omega_l = \sum_{\{i,j\} \in E} |(v'_i - v'_j) - s_{ij} R_{ij}(v_i - v_j)|^2, \quad (1)$$

$$v'_i \in V', s_{ij} = \frac{D}{|v_i - v_j|},$$

$$R_{ij} = \begin{bmatrix} \cos\theta_{ij} & -\sin\theta_{ij} \\ \sin\theta_{ij} & \cos\theta_{ij} \end{bmatrix},$$

where $\theta_{ij}$ is the unknown rotation angle and $D=\{D_\alpha, D_\beta\}$ depends on whether or not the edges should be magnified. Clearly, the scaling factor $s_{ij}$ is applied to constrain the edge lengths. The rotation $R_{ij}$ allows each edge to rotate because the geographic transportation networks are usually jaggy and we expect the deformed metro map to be smooth.

In order to distinguish different lines at a station $v_i$, the included angles of incident edges should be identical. To implement this idea, we set each included angle of neighboring edges $\{i, j\}$ and $\{i, k\}$ to $\theta=2\pi/f$, where f is the number of edges sharing $v_i$. Since the edges are assumed to have an identical length and the included angle $\theta$ is known, we achieve this aim by preserving the relative positions of $v_i$, $v_j$ and $v_k$. Specifically, denote by N(i) the neighboring edges sharing $v_i$, we introduce the energy term $$\Omega_m = \sum_{v'_i \in V'} \sum_{\{i,j\},\{i,k\} \in N(i)} \left| v'_i - \left(v'_j + u'_{jk} + \tan\left(\frac{\pi-\theta}{2}\right) u'_{jk}\right) \right|^2, \quad (2)$$

where $$u'_{jk} = \frac{1}{2}(v'_k - v'_j).$$

This constraint also can preserve the straightness of each transportation line because $\theta=\pi$ when there are only two incident edges. In this case, $$\tan\left(\frac{\pi-\theta}{2}\right) = 0$$

and Eq. 2 becomes $$\Omega_m = \sum_{v'_i \in V'} \sum_{\{i,j\},\{i,k\} \in E} \left| v'_i - \frac{1}{2}(v'_j + v'_k) \right|^2 \quad (3)$$

so that we can enforce $v'_i$, $v'_j$ and $v'_k$ to be collinear.

Since $\Omega_m$ and $\Omega_l$ represent only the relative node positions, we need at least one positional constraint to determine the map position. Therefore, we slightly enforce each node close to its original position because our goal is to deform the metro map. This constraint provides the basic geographic guidance to the objective function, such that our method will not place the north station at the south during the deformation. Therefore, we give the energy term $$\Omega_g = \sum_{v'_i \in V'} |v'_i - v_i|^2. \quad (4)$$

In addition to $\Omega_m$, $\Omega_l$, and $\Omega_g$, the optimization of a metro map should retain the deformed nodes inside the bounding space and prevent the edges that have no sharing nodes from intersection. To achieve the boundary condition, we expect the x and y coordinates of each node to be within the specified range. To avoid the edge intersections, we prevent the distance of a node $v'_i$ and an edge $\{j, k\}$ from being too close. That is, we minimize $$\Omega = \Omega_m + w_l \Omega_l + w_g \Omega_g$$

$$x_{min} < v'_{i,x} < x_{max}, y_{min} < v'_{i,y} < y_{max}$$

$$|v'_i - p_{jk}| \geq \epsilon, v_i \in V', \{j,k\} \in E \quad (5)$$

to compute the deformed map, where $w_l$ and $w_g$ are the weighting factors used to compromise the importance of different criteria; $p'_{jk} = rv'_j + (1-r)v'_k$ is the closest point of edge $\{j,k\}$ to $v'_i$; $0 \leq r \leq 1$ is the combination ratio that can be obtained from the point line theory; and $(x_{min}, y_{min})$ and $(x_{max}, y_{max})$ are the top left and bottom right corners of the bounding space, respectively.

Figures 2A, 2B:
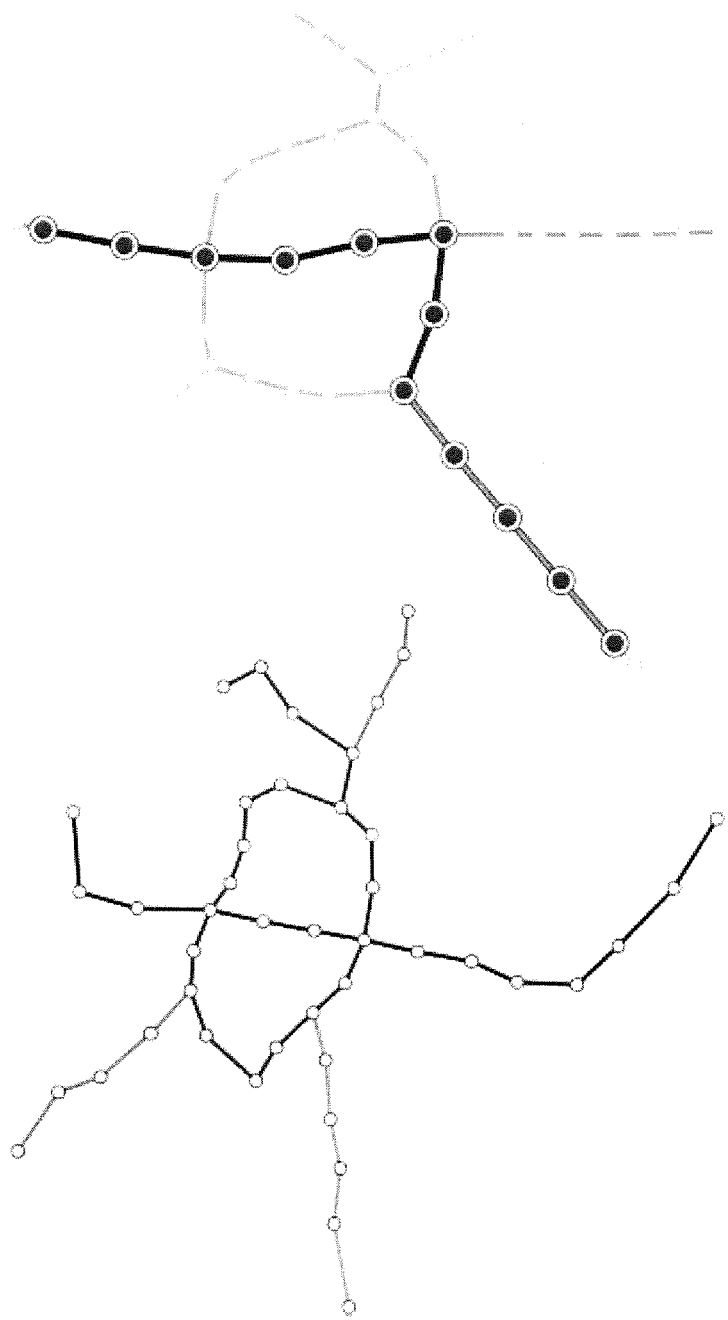
Figure 3:
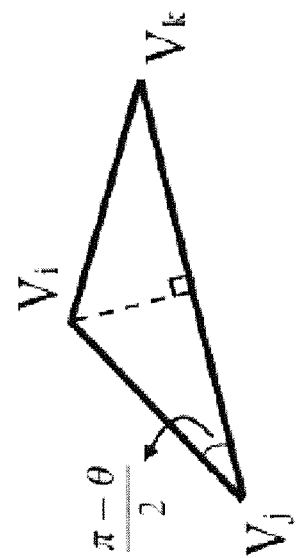
FIG. 3 schematically shows the included angles corresponding to three stations $v_i$, $v_j$ and $v_k$ according to one embodiment of the presented invention.
Figure 3:
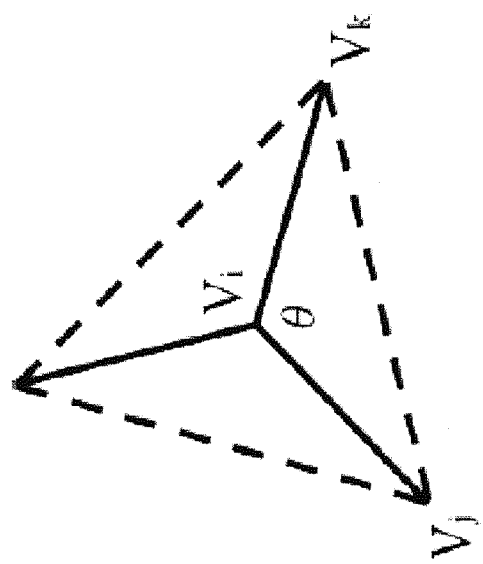

After Step S12, the original metro map shown in FIG. 2a is converted into the deformed version shown in FIG. 2b.

Step S14: perform an optimization process to schematize route directions.

We schematize the edge directions based on the deformed smooth metro map. Namely, we rotate each deformed edge $v'_i$-$v'_j$ to have the nearest octilinear direction and solve the optimization again. Formally, we give the energy term $$\Omega_o = \sum_{\{i,j\} \in E} |(\tilde{v}_i - \tilde{v}_j) - f(v'_i - v'_j)|^2, \quad (6)$$

where $$\tilde{v}_i, \tilde{v}_j \in \tilde{V},$$

and $f$ is the function that rotates the edge to the closest octilinear direction. We denote by $w_o$ the weighting factor of $\Omega_o$ and minimize $\Omega_g + w_o \Omega_o$ subject to the boundary conditions and the edge intersection constraints, which are similar to those in Eq. 5, to obtain the schematic metro map. Note that $\Omega_m$ and $\Omega_l$ are not included in this step because $f(v_i'-v_j')$ already implies regular lengths and the right directions.

Next, we explain how we minimize the objective function 52 to solve for the deformed node positions V'. Similarly, the octilinearized node positions $\tilde{V}$ can be obtained using this approach. We transform $\Omega_m$, $\Omega_l$ and $\Omega_g$ into a linear system AV'=b(V') and solve for the deformed node positions in a matrix form. Because the constraints are more than the unknowns, the coefficient matrix A is overdetermined. Thus, we compute the node positions $V'=(A^TA)^{-1}A^Tb'$ in a least squares sense.

Note that the rotation matrix $R_{ij}$ in Eq.1 is unknown, and the boundary conditions and the edge intersection constraints are inequalities. We solve this non-linear optimization using the Gaussian Newton method, in which the node positions V' and the edge rotations $R_{ij}$ are updated iteratively. That is, we consider $R_{ij}$ as additional unknown variables and solve V' and $R_{ij}$ alternatingly. The system starts the optimization by setting $R_{ij}$ as an identity matrix and solves for V' by computing the linear system. It then updates $R_{ij}$ by computing the rotation angle $\theta_{ij}$ that rotates the edge $v_i$-$v_j$ to $v_i'$-$v_j'$. The integrated energy decreases as V' and $R_{ij}$ are updated. We repeat this procedure until the solution converges.

To ensure the nodes moving within the bounding space, we also check whether or not the coordinates of $v_i' \in V'$ within $(x_{min}, y_{min})$ and $(x_{max}, y_{max})$ in each iteration. If $v_i$ violates the boundary condition, we add an additional energy term $$\Omega_b(v_i') = \begin{cases} |v_{i,x}'|^2 & v_{i,x}' < 0 \\ |v_{i,x}' - x_{max}|^2, & \text{if } v_{i,x}' > x_{max} \\ |v_{i,y}'|^2 & v_{i,y}' < 0 \\ |v_{i,y}' - y_{max}|^2 & v_{i,y}' > y_{max} \end{cases} \quad (7)$$

to enforce the node sliding along the respective boundary lines. On the other hand, to avoid edge intersections, we set the edge-node distance to $\epsilon$ if the edge $\{j, k\}$ and the node $v_i'$ are too close. Since $p_{jk}'$ is linear in $v_j'$ and $v_k'$ (see Eq. 5), we can obtain its combination ratio r in the previous step and minimize $$\Omega_c(v_{i \to jk}') = |(v_i' - p_{jk}') - \delta_{i \to jk}(v_i - p_{jk})|^2, \quad (8)$$

where $$p_{jk} = r \cdot v_j + (1-r) \cdot v_k,$$

$$\delta_{i \to jk} = \frac{\varepsilon}{|v_i - p_{jk}|},$$

to retain the minimal distance $\epsilon$ between $v_i'$ and $p_{jk}'$. Because $\{j, k\}$ and $v_i'$ are only preserved to have at least $\epsilon$ length, two edges may still intersect with each other if the distances of four endpoints are large. Nevertheless, we can assume that edge intersections do not exist in the original map and check if this error occurs when updating the node positions V'. We set V'=V+(V'-V)/2 iteratively until the updated graph satisfies the edge intersection constraints. After Step S14, the deformed smooth metro map shown in FIG. 2b is optimized to be the one shown in FIG. 2c.

Step S16: label the names of focal stations that the user will pass by.

We label the names of focal stations after the schematic layout is obtained. To simplify the map complexity, we require the labels to lie in octilinear directions, denoted by L={east, west, north, south, north-east, south-east, south-west, north-west}. Our goal is to prevent the label occlusions while encouraging neighboring labels to be placed coherently. To implement this idea, we introduce energy terms to measure the niceness of each label position according to preference, visibility, and consistency. We then solve for the optimal label positions $H=\{h_0, h_1, \ldots, h_m\}$, where m is the number of focal stations, by minimizing the following energy terms.

Preferential Position.

Figure 4:
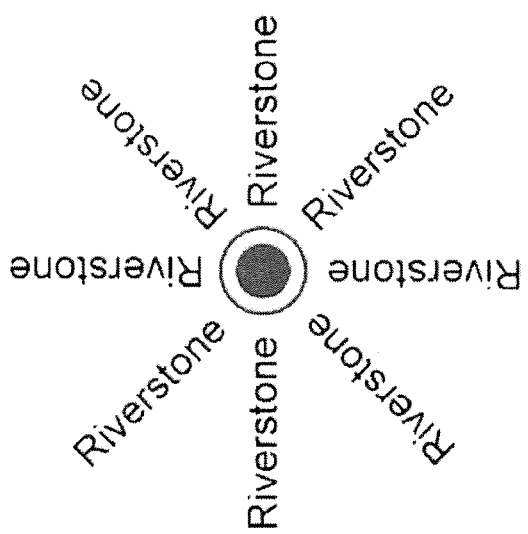
FIG. 4 schematically shows a station name labeled in different orientations with the respective penalties according to one embodiment of the presented invention.

Although a label can be placed at any position in L, people tend to prefer some positions to others. To satisfy this constraint, we assign smaller energies to the preferential positions such that they have higher priorities to be chosen. FIG. 4 shows the label position $h_i \in H$ with the corresponding energies $\Psi_p(h_i)$ used in the presented invention.

Label Occlusions.

Occlusions would dramatically decrease label readability. Thus, we represent each label $h_i$ as a quad $q_i$ and apply the quad to detect if $h_i$ intersects the other labels or if it is cropped by the screen. Specifically, we set the energy of the label-to-label intersection $$\Psi_q(h_i, h_j) \begin{cases} 1 & \text{if } q_i \text{ intersects } q_j \\ 0 & \text{else,} \end{cases} \quad (9)$$

where i, j denote arbitrary node indices. Similarly, we set the label-to-label boundary energy $\Psi_b(h_i, h_j)=1$, if $q_i$ intersects any one of the boundary lines. Otherwise, we set $\Psi_b(h_i, h_j)=0$.

Spaciousness.

To avoid occlusions and to achieve aesthetics, visual masses are encouraged to be of equal weights. We thus label station names at spacious regions. In addition to detecting intersections between nodes, edges, and labels, we expect additional spaces between them. When creating focus+context layouts, this constraint is only applied to the focal edges because the contextual edges do not contain crucial information. To define how spacious the label position is, for each label $h_i$, we magnify its represented quad $q_i$ two times longer along the extending direction and denote it as $qq_i$. We then detect where $qq_i$ intersects nodes or edges and introduce the energy term $$\Psi_e(h_i) = \begin{cases} 1 & t < 0.5 \\ 1 - 2(t-0.5) & \text{if } t > 0.5, \\ 0 & t > 1 \end{cases} \quad (10)$$

$$t = \frac{|c_i - \tilde{v}_i|}{qq_{i,d}},$$

where $c_i$ is the closest intersection point to the node $\tilde{v}_i$ and $qq_{i,d}$ is the diagonal length of $qq_i$.

Coherence.

We expect the labels to appear at coherent positions to improve readability. In this scenario, people can read the labels sequentially without switching their attention. The coherence makes our focus+context map more intuitive. Thus, we add the energy term $$\Psi_s(h_i, h_j) = \begin{cases} 0 & \text{if } h_i = h_j \\ 1 & \text{else} \end{cases} \quad (11)$$

where $$\{i, j\} \in E$$

to enforce neighboring labels to be placed at the same position.

To satisfy all the aforementioned criteria, we integrate the energy terms and search for the set H of label positions that minimizes $$\Psi = \sum_{h_i \in H} (w_p \Psi_p(h_i) + w_b \Psi_b(h_i) + w_e \Psi_e(h_i)) \sum_{h_i, h_j \in H} w_q \Psi_q(h_i, h_j) + \sum_{i, j \in E} w_s \Psi_s(h_i, h_j) \quad (12)$$

The weighting factors are specified to indicate the importance of each term. We set $w_p=w_s=1$, $w_e=w_q=10$ and $w_b=20$ to all our experimental results. Given that the screen of a mobile device is small, the labels shown in our focus+context map should be large in contrast to the layout, which is very different to a general metro map. This requirement, however, makes the occlusion preservation more challenging, especially when there are many focal edges in a complicated map. We set $w_b$ to the largest value because labels must appear in the screen. In contrast, the nodes, edges, and labels are potentially occluded if long station names are displayed in a complicated map.

Figure 5:
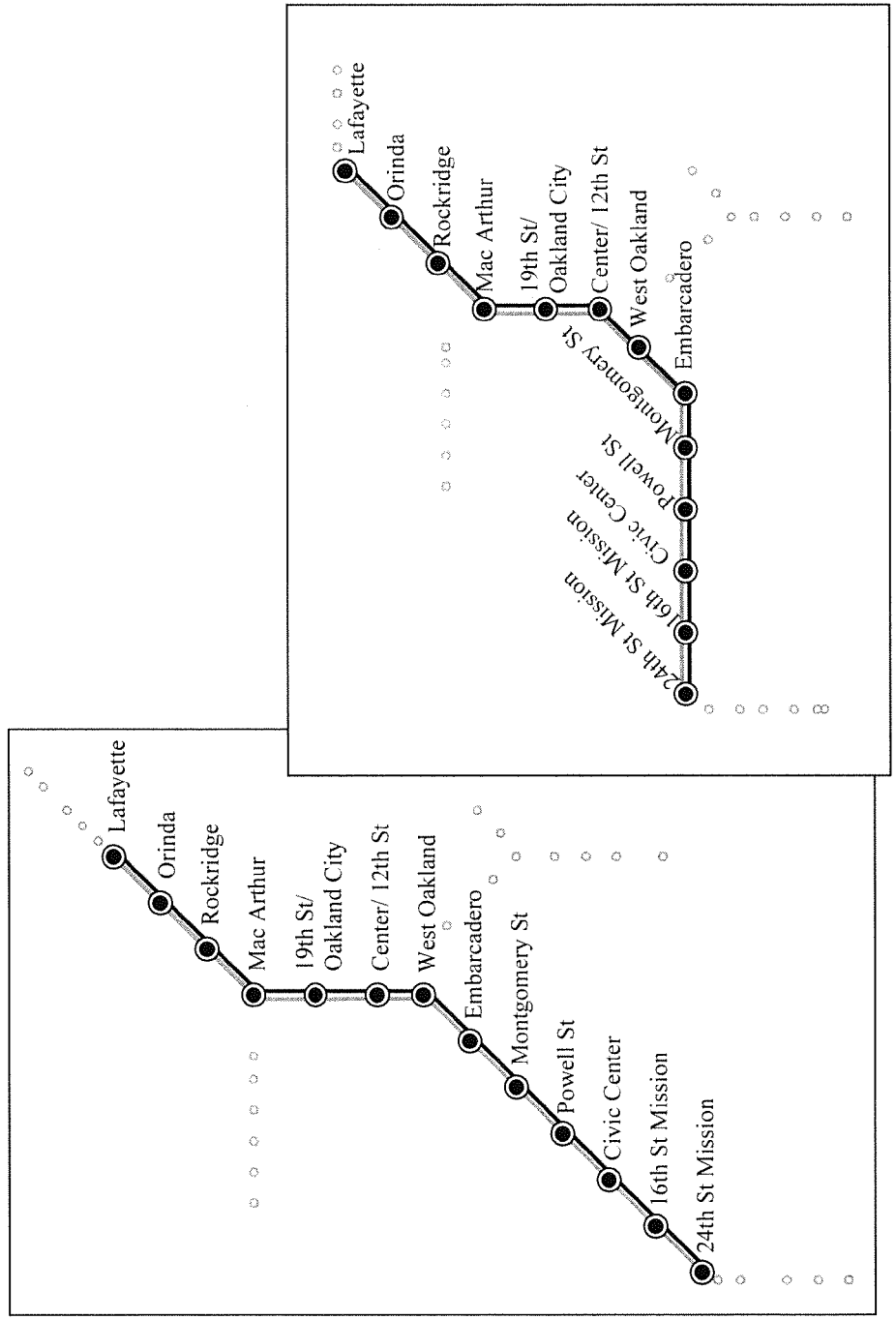
FIG. 5 schematically shows the presentations of a metro map visualized in different resolution screens according to one embodiment of the presented invention.

The presented invention deforms the metro map according to the screen resolutions. In FIG. 5, a screen is rotated by 90 degrees. In such case, the metro map is optimized to have different appearances and the labels may extend in different orientations.

In conclusion, the presented invention introduces a method to visualize a complicated metro map in a limited displaying area, wherein 1) the deformed metro map is schematic, 2) the focal edges that the user will pass by are magnified to have $D_\alpha$ length while the contextual edges are shrunk to have $D_\beta$ length, 3) the included angles of incident edges are enforced to be equal so as to disperse routes, 4) each route is straightened and extended in an octilinear direction, 5) the focal stations are labeled with the names, 6) the metro map is optimized to have an esthetic appearance, and 7) the metro map can be visualized in a limited displaying area so that the user can understand the transportation network easily without manually dragging it.

The embodiments described above exemplify but does not limit the scope of the presented invention. Any equivalent modification or variation according to the characteristic or spirit of the presented invention also is included within the scope of the presented invention.

What is claimed is:

1. A method for visualizing a metro map in a limited displaying area, wherein said metro map contains a plurality of routes, each said route has a plurality of station nodes, each pair of adjacent station nodes are connected by an edge, and said method comprises the steps:
   a. download a geographic metro map covering a focal route and neighboring transportation networks, the focal route being defined by a start station node and a destination station node that are given by a user, the focal route having a set of focal station nodes including said start station node, said destination station node, and focal edges connecting the focal station nodes, the neighboring transportation networks including contextual routes having contextual station nodes and contextual edges connecting the contextual station nodes;
   b. selectively magnify focal station nodes and said connecting focal edges, said focal edges within said focal route being magnified to have a predetermined length greater than a length of the contextual edges outside of said focal route, and deform said focal and contextual routes to generate a smooth metro map;
   c. rotate said focal and contextual routes to lie in octilinear directions; and
   d. selectively label only station nodes of said focal route with identifying names.

2. The method for visualizing a metro map in a limited displaying area according to claim 1, wherein said edges which are adjacent are encouraged to have identical directions.

3. The method for visualizing a metro map in a limited displaying area according to claim 1, wherein said station node that is connected with a plurality of said edges is enforced to have identical included angles.

4. The method for visualizing a metro map in a limited displaying area according to claim 3, wherein said station node that has only two connected edges is constrained to be collinear with adjacent station nodes respectively connected via said two connected edges thereto.

5. The method for visualizing a metro map in a limited displaying area according to claim 1, wherein each station node is within the space boundaries, and said edges that have no sharing station nodes do not intersect.

6. The method for visualizing a metro map in a limited displaying area according to claim 1, wherein said edges are rotated to be vertical, horizontal 45-degree, or 135-degree diagonal to obtain a schematic layout.

7. The method for visualizing a metro map in a limited displaying area according to claim 1, wherein a Gaussian Newton method is used to solve non-linear optimization, and said stations' positions and said edge orientations are iteratively updated to deform said metro map.

8. The method for visualizing a metro map in a limited displaying area according to claim 1, wherein said station nodes and said focal edges that the user will pass by are highlighted via magnification and said contextual edges are demagnified.

9. The method for visualizing a metro map in a limited displaying area according to claim 1, wherein an optimal orientation of each station label is computed by minimizing penalties that are measured from preference, consciousness and occlusion of said station nodes.

10. The method for visualizing a metro map in a limited displaying area according to claim 9, wherein a quadrangle is computed based on said label, and said quadrangle is used to check whether or not said label intersects other labels.

11. The method for visualizing a metro map in a limited displaying area according to claim 10, wherein a quadrangle having double length extending in one of its directions relative to another direction is used to check whether or not said label overlaps said station nodes or said connecting edges.

12. The method for visualizing a metro map in a limited displaying area according to claim 1, wherein neighboring labels of said station nodes have an identical orientation.

13. The method for visualizing a metro map in a limited displaying area according to claim 1, wherein said geographic metro map is downloaded from a database or network.

\* \* \* \* \*